United States Patent [19]

Bennett et al.

[11] Patent Number: 5,666,223

[45] Date of Patent: Sep. 9, 1997

[54] HIGH-EFFICIENCY K-SHEET POLARIZER

[75] Inventors: Stewart Bennett, Concord; John J. Cael, Mendon; Narendra S. Kadaba, Chestnut Hill; Giorgio B. Trapani, Cambridge, all of Mass.

[73] Assignee: Polaroid Corporation, Cambridge, Mass.

[21] Appl. No.: 565,877

[22] Filed: Dec. 1, 1995

[51] Int. Cl.⁶ ............................. B29C 55/04; G02B 1/00
[52] U.S. Cl. ..................... 359/490; 264/1.34; 264/108; 264/289.6; 359/498; 428/910
[58] Field of Search ..................... 264/289.6, 1.34, 264/1.31, 108, 185; 428/483, 910; 359/490, 483, 489, 498

[56] References Cited

U.S. PATENT DOCUMENTS

| | | |
|---|---|---|
| 2,173,304 | 5/1939 | Land et al. |
| 2,255,940 | 9/1941 | Rogers . |
| 2,306,108 | 12/1942 | Land et al. |
| 2,445,555 | 7/1948 | Binda . |
| 2,453,186 | 11/1948 | Binda . |
| 2,554,850 | 5/1951 | Binda . |
| 2,674,159 | 4/1954 | Binda . |
| 3,265,777 | 8/1966 | Marks et al. ............... 264/1.34 |
| 3,647,442 | 3/1972 | Malster ........................ 96/29 |
| 3,914,017 | 10/1975 | Bedell et al. . |
| 4,166,871 | 9/1979 | Schuler . |
| 4,292,370 | 9/1981 | Pekko ........................ 428/355 |
| 4,463,138 | 7/1984 | Wu et al. ................... 264/185 |
| 4,526,818 | 7/1985 | Hoshikawa et al. ........ 156/106 |
| 4,818,624 | 4/1989 | Downey, Jr. .............. 428/447 |
| 4,895,769 | 1/1990 | Land et al. ................. 428/483 |
| 5,071,906 | 12/1991 | Tanaka et al. .............. 524/557 |
| 5,073,014 | 12/1991 | Ostoja-Starzewski ...... 359/490 |
| 5,286,420 | 2/1994 | Claussen et al. ........... 264/1.3 |

FOREIGN PATENT DOCUMENTS

| | | | |
|---|---|---|---|
| 56-48601 | 5/1981 | Japan | 264/108 |
| 57-115507 | 7/1982 | Japan | 264/108 |

*Primary Examiner*—Jeffery R. Thurlow
*Attorney, Agent, or Firm*—Renato M. de Luna

[57] ABSTRACT

This invention relates to a new and improved light-polarizing sheet comprising molecularly oriented polyvinyl alcohol containing an oriented block segments of polyvinylene and said polyvinyl alcohol. In particular, the polarizing sheet comprises a polyvinylalcohol/polyvinylene block copolymer material wherein the polyvinylene blocks thereof are formed by molecular dehydration of a sheet of polyvinylalcohol; said sheet of polyvinylalcohol/polyvinylene block copolymer material comprising a uniform distribution of light-polarizing molecules of polyvinylalcohol/polyvinylene block copolymer material varying in the length, n, of the conjugated repeating vinylene unit of the polyvinylene block of the copolymer throughout the range of from 2 to 24; the concentration of each of said polyvinylene blocks, as determined by the absorption of wavelengths ranging from 200 to 700 nm remaining relatively constant, the degree of orientation of said light-polarizing molecules, as measured by the spectral dichroic ratio, $R_D$, of said blocks, increasing throughout said range with increasing length, n, of said polyvinylene blocks; said polyvinylene block concentration and said degree of orientation of said molecules imparting to said sheet a photopic dichroic ratio, $R_D$, of at least approximately 45.

10 Claims, 4 Drawing Sheets

HIGH-EFFICIENCY K-SHEET POLARIZER

FIELD OF THE INVENTION

In general, the present invention relates to synthetic dichroic plane polarizers based on molecularly oriented polyvinyl alcohol sheets. In particular, the invention relates to a high-efficiency "K-sheet"-type light-polarizing sheet with a balanced concentration of light-absorbing chromophores and to its method of manufacture.

BACKGROUND

Normally, light waves vibrate in a large number of planes about the axis of a light beam. If the waves vibrate in one plane only, the light is said to be plane polarized. Several useful optical ends and effects can be accomplished by plane polarized light. For example, in the manufacture of electrooptical devices, such as liquid crystal display screens, crossed polarizers are used in conjunction with an addressable liquid crystal interlayer to provide the basis for image formation. In the field of photography, polarizing filters have been used to reduce glare and the brightness of specular reflection. Polarizing filters (circular or otherwise) have also been used for the reduction of glare on CRT display monitor screens.

While several materials possess to a degree inherent polarizing properties, synthetic polarizing materials based on thin polymeric films are desirable for their comparative ease of manufacture and handling, their ability to be tailored for particular uses, and the comparative ease with which they may be incorporated into desired end products.

The production of linear light polarizing films has been well described in the art. Linear light polarizing films, in general, owe their properties of selectively passing radiation vibrating along a given electromagnetic radiation vector (and absorbing electromagnetic radiation vibrating along a second given electromagnetic radiation vector) to the anisotropic character of the transmitting film medium.

Dichroic polarizers are linear polarizers of an absorptive variety that owe their light-polarizing capabilities to the vectorial anisotropy of their absorption of incident light waves. The term "dichroism" is used herein as meaning the property of differential absorption of the components of an incident beam of light, depending upon the vibration directions of said component. Thus, light entering a dichroic film encounters two different absorption coefficients—one low and one high. The emerging light vibrates predominantly in the direction of low absorption.

The most widely used type of synthetic dichroic sheet polarizer is the polyvinyl alcohol-iodine complex polarizer (cf., "H-Sheet"-type polarizer) and variants thereof, the first such polarizer having been invented by Edwin H. Land of Polaroid Corporation (U.S. Pat. No. 2,454,515, issued Nov. 23, 1948 on an application filed Oct. 29, 1938). In general, an "H-sheet"-type polarizer comprises a light-absorptive linear polyiodide contained within a polyvinyl alcohol matrix. "H-sheet"-type polarizers are generally made, for example, by impregnating a film of polyvinyl alcohol (or its derivative) with an aqueous solution of a light-absorptive polyiodide (or like dichroic dye) and then thermally stretching the film several times its length so that the resultant high molecular weight molecules are unidirectionally oriented. By orienting the polyvinyl alcohol matrix unidirectionally, the transition moments of the light-absorptive polyiodide become correspondingly oriented. The material thus becomes visibly dichroic.

Since the base material of "H-sheet"-type polarizers is a water-soluble high molecular weight substance, the resulting film oftentimes manifests comparatively low moisture resistance, and—in an unprotected state—tends to curl, peel, or otherwise warp when exposed to ambient atmospheric moisture. Although "H-sheet"-type polarizing film exhibits good polarizing properties (cf., a photopic dichroic ratio, $R_D$, greater than 80), for certain applications, its moisture and heat resistance is less than desirable.

Contemporaneously with the development of the first "H-Sheet"-type polarizers, investigations of a so-called "K-Sheet" polarizer were conducted by Edwin H. Land and Howard G. Rogers at Polaroid Corporation (see U.S. Pat. Nos. 2,173,304, 2,255,940, and 2,306,108), with further development work being undertaken by F. J. Binda (see U.S. Pat. Nos. 2,445,555, 2,453,186, 2,554,850, and 2,674,159).

In contrast to "H-sheet"-type polarizers and other synthetic dichroic plane polarizers, a "K-sheet"-type polarizer derives its dichroism from the light-absorbing properties of its matrix, not from the light-absorbing properties of dye additives, stains, or suspended crystalline material. The first "K-sheet" polarizer comprised an oriented suspension of a dichroic dehydration product of polyvinyl alcohol (i.e., "polyvinylene"), in a molecularly oriented film of polyvinyl alcohol. The manufacture of such polarizer began by dehydrating sheets of polyvinyl alcohol (PVA), preferably by heating them in the presence of a very strong acid catalyst such as fuming hydrochloric acid, liberating water molecules and producing conjugated blocks of polyvinylene. Then, to effect the desired anisotropic property, the dehydrated sheet was unidirectionally stretched, aligning the conjugated polyvinylene blocks, and thus orienting the dichroic moments thereof. Due to its greater hydrophobicity (and inherent stability), early applications of such polarizers focused on optical systems where the polarizer would be subjected to high temperatures, to wide temperature fluctuations, and to extreme variations in humidity.

Although early "K-Sheet"-type polarizing film provided better heat and moisture resistance than its contemporary "H-Sheet"-type polarizing film, its optical properties were not as desirable as those of the "H-Sheet" variety. As such, early "K-Sheet" did not achieve the same degree of widespread acceptance and commercial success obtained by "H-Sheet". And accordingly, rather than improve the optical properties of early "K-sheet", subsequent efforts were more vigorously directed to improving the moisture-resistance of "H-sheet" type polarizers.

In general, two strategies were employed: one being mechanical in nature, the other chemical. With regard to the mechanical approach, water resistance in "H-sheet"-type polarizers was effected by isolating its hygroscopic material from the ambient environment in, for example, a protective envelope or laminate, see e.g., U.S. Pat. No. 4,416,946 (fluorocarbon-based moisture barrier). With regard to the chemical approach, investigations were directed to identifying and implementing hydrophobic alternatives to polyvinyl alcohol, e.g., U.S. Pat. Nos. 4,842,781, and 5,286,418; cf., U.S. Pat. No. 2,572,315, issued to J. E. Campbell on Oct. 23, 1951, and U.S. Pat. Nos. 3,621,085, 4,229,498 and 4,230,768 (dehydrohalogenation of polyvinyl chloride). With efforts weighted heavily toward the improvement of "H-sheet"-type polarizers, the investigation of "K-sheet"-type polarizers receded, and to present day, has remained virtually unpursued since the 1940s.

Currently, much commercial attention has been directed to the development and improvement of flat panel displays, and in particular, liquid crystal displays. In conjunction with the accelerated technical development of such displays, consideration is directed toward polarizers having good light-polarizing efficiency and reduced production costs. While "H-sheet"-type polarizers continue to be used in liquid crystal displays, an alternative is sought having comparable optical properties, but with moisture-resistance imparted through less costly mechanisms or approaches.

SUMMARY OF THE INVENTION

In response to the aforementioned need, the present invention provides an improved, moisture-resistant, "K-sheet"-type polarizer having polarizing properties comparable to or better than that of "H-sheet"-type polarizers.

The present invention contemplates a light polarizer comprising a molecularly oriented sheet of polyvinylalcohol/polyvinylene block copolymer material having the polyvinylene blocks thereof formed by molecular dehydration of a sheet of polyvinylalcohol. In accordance with the present invention, the molecularly oriented sheet of polyvinylalcohol/polyvinylene block copolymer material comprises a uniform distribution of light-polarizing molecules of polyvinylalcohol/polyvinylene block copolymer material varying in the length (n) of the conjugated repeating vinylene unit of the polyvinylene block of the copolymer throughout the range of from 2 to 24. The sheet is stretched prior to, subsequent to, or during the dehydration step with the result that the light-polarizing molecules become oriented, and such that the degree of orientation of said molecules increases throughout said range with increasing length (n) of said polyvinylene blocks. Further, the concentration of each of the polyvinylene blocks—as determined by the absorption of light by said blocks—remains comparatively constant (i.e., "balanced") through said range. The degree of orientation of said molecules in conjunction with the concentration distribution of each polyvinylene block is sufficient to impart to said sheet a photopic dichroic ratio ($R_D$), of at least 45.

Accordingly, a principle and particular object of the invention is to provide a light-polarizing sheet comprising a molecularly oriented linear polyvinyl alcohol, said light-polarizing sheet having an oriented dichroic polyvinyl alcohol/polyvinylene block copolymer formed therein, the distribution of conjugation lengths, n, of the vinylene block segments being essentially in the range of n=2 to 24 and wherein the light-polarizing sheet is stretched sufficiently to impart to said sheet a peak photopic dichroic ratio, $R_D$, greater than approximately 45.

Another object of the present invention is to provide a polarizer having both good polarizing efficiency and good moisture resistance.

Another object of the invention is to provide a process for the manufacture of light-polarizing material of the character described. In particular, the present invention provides a method for making polarizing sheet material, the method involving an initial unidirectional stretching step and a subsequent unidirectional extension step, the subsequent extension step extending the length of the sheet beyond the length obtained in the initial stretching step.

The invention accordingly comprises the several steps and the relation of one or more of such steps with respect to each of the others, and the product possessing the features, properties, and the relation of elements which are exemplified in the following detailed description, and the scope of the application of which will be indicated in the claims.

DETAILED DESCRIPTION OF THE INVENTIVE SUBJECT MATTER

The present invention contemplates a highly efficient, moisture resistant (light polarizer comprising a molecularly oriented sheet of polyvinylalcohol/polyvinylene block copolymer material having the polyvinylene blocks thereof formed by molecular dehydration of a sheet of polyvinylalcohol. The molecularly oriented sheet of polyvinylalcohol/polyvinylene block copolymer material can be identified initially by its uniform distribution of light-polarizing molecules of said polyvinylalcohol/polyvinylene block copolymer material wherein the length (n) of the conjugated repeating vinylene unit of the polyvinylene block of the copolymer varies predominantly throughout the range of 2 to 24. Further inspection of the molecularly oriented sheet will reveal that the degree of orientation of said light-polarizing molecules—as quantified by consideration of spectral dichroic ratio—increases throughout the aforementioned range of conjugation lengths incrementally with increasing length (n) of said polyvinylene blocks.

Figure 1:
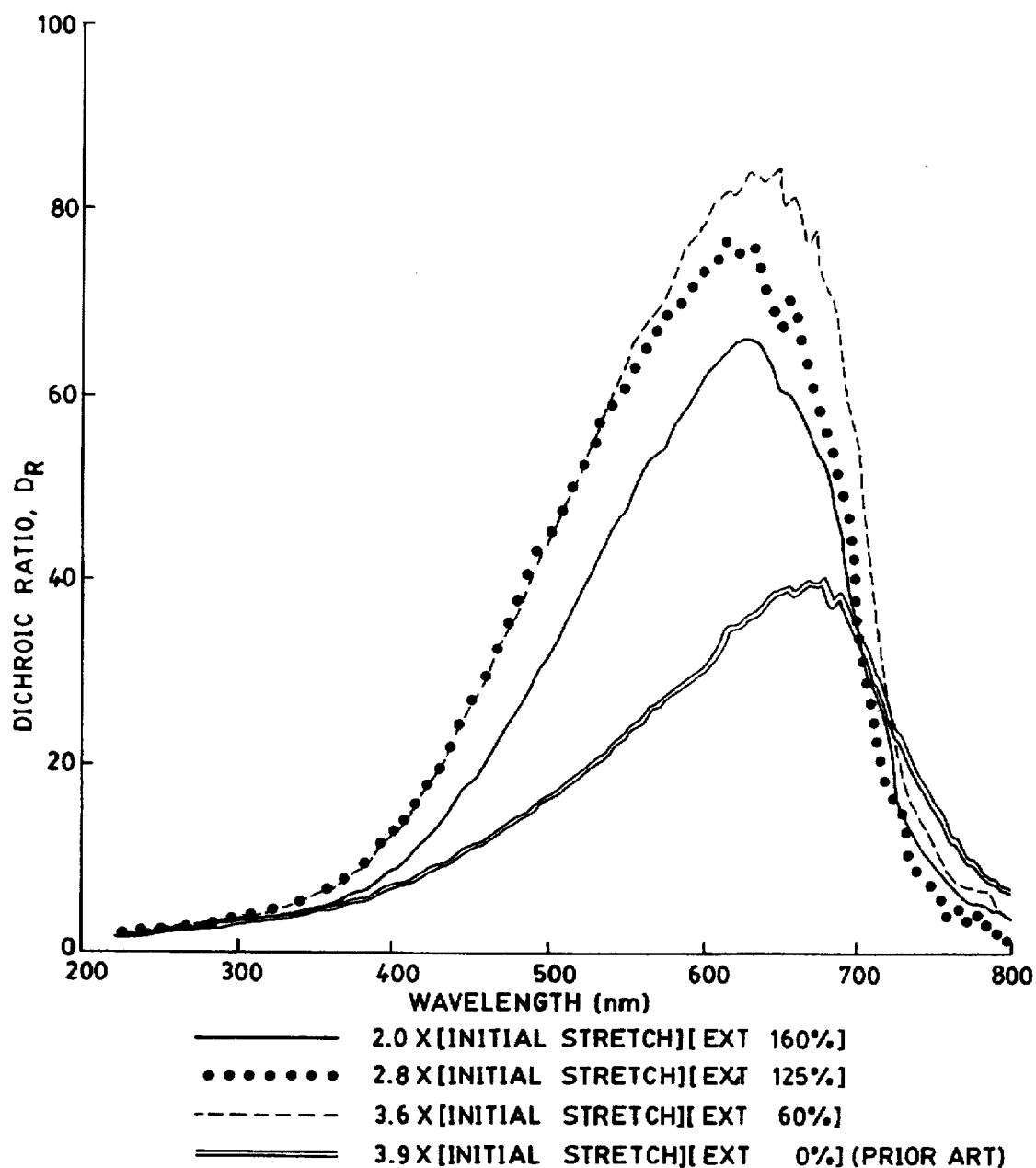
FIG. 1 is a graph plotting the spectral dichroic ratio, $R_D$, of three representative samples of inventive K-polarizers (varying in their initial unidirectional stretch and subsequent extension, i.e., EXT) and a sample of a prior art K-polarizer (unidirectionally stretched without subsequent extension).

Reference is made to FIG. 1, which—as indicated above—is a graph plotting the dichroic ratio, $R_D$, of three representative samples of the inventive polarizer (varying in their initial unidirectional stretch and subsequent extension, i.e., EXT) and a sample of a prior art K-polarizer (unidirectionally stretched with no subsequent extensions, i.e., no EXT). From FIG. 1, it will be appreciated that the dichroic ratio of the chromophores in each of the inventive K-polarizers is substantially larger than the dichroic ratio of the corresponding chromophores in the representative prior art K-sheet, and particularly so for the chromophores contributing to the polarizing properties in the near-red wavelengths of 600 nm to 700 nm. Thus, while the dichroic ratio of the chromophores in the prior art K-sheet also increase incrementally with the conjugation lengths (n) of its polyvinylene blocks, a more precipitous increase is observed in the case of the polarizing sheets of the present invention.

In addition to observing a greater degree of orientation, the present inventors have also observed absorption values that define a concentration distribution of oriented chromophoric moieties (i.e., the conjugated blocks) that is substantially uniform throughout wavelengths ranging from 200 nm to 700 nm, which—in addition to improving polarizing properties—results in a visually observable and highly desirable neutral gray tone. Although the exact causative factors leading to this chromophoric configuration are not very well understood, substantially uniform concentration distributions have been consistently reproduced and observed in the "stretched and extended" polarizing sheets made in accordance with the methods described further below.

Figure 4:
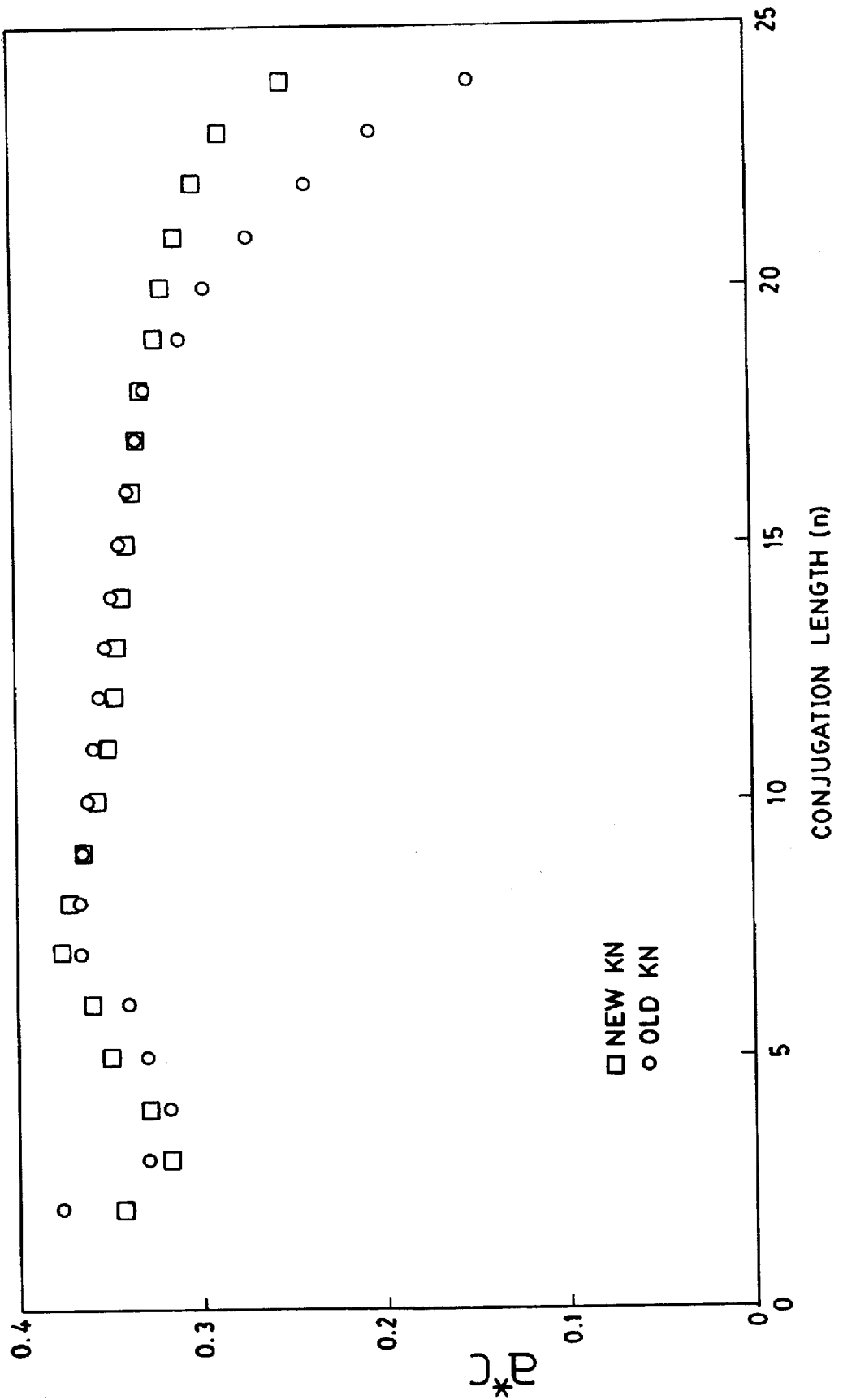
FIG. 4 is a graph plotting absorption (i.e., absorptivity times concentration, a*c) against conjugation length, n, for a representative prior art polarizing sheet and a representative polarizing sheet according to the present invention.

The comparably more uniform, "flatter", or alternatively "balanced" chromophoric concentration distribution is exemplified by the numerical data provided by the following table (transmission @42 KV), said data also being plotted in FIG. 4.

| Conjugation Length, n | Wavelength, nm | Absorption, a × c (New "K") | Rel. Conc. % | Absorption, a × c (Prior Art "K") | Rel. Conc. % |
|---|---|---|---|---|---|
| 2 | 233 | 0.34290 | — | 0.37675 | — |
| 3 | 276 | 0.31743 | — | 0.32943 | — |
| 4 | 309 | 0.32819 | — | 0.31750 | — |
| 5 | 339 | 0.34958 | — | 0.33045 | — |
| 6 | 372 | 0.36466 | — | 0.34819 | — |
| 7 | 394 | 0.37522 | — | 0.36555 | — |
| 8 | 420 | 0.37092 | — | 0.36622 | — |
| 9 | 445 | 0.36319 | — | 0.36396 | — |
| 10 | 472 | 0.35537 | — | 0.35992 | — |
| 11 | 492 | 0.35006 | — | 0.35740 | — |
| 12 | 512 | 0.34686 | — | 0.35420 | — |
| 13 | 527 | 0.34395 | — | 0.35070 | — |
| 14 | 543 | 0.34075 | — | 0.34704 | — |
| 15 | 557 | 0.33824 | — | 0.34311 | — |
| 16 | 571 | 0.33521 | — | 0.33853 | — |
| 17 | 584 | 0.33237 | — | 0.33270 | — |
| 18 | 595 | 0.32981 | — | 0.32779 | — |
| 19 | 622 | 0.32262 | 94 | 0.30892 | 89 |
| 20 | 637 | 0.31824 | 93 | 0.29524 | 85 |
| 21 | 652 | 0.31119 | 91 | 0.27140 | 78 |
| 22 | 667 | 0.30076 | 88 | 0.23910 | 68 |
| 23 | 681 | 0.28634 | 94 | 0.20282 | 58 |
| 24 | 695 | 0.25191 | 74 | 0.14967 | 43 |

Evident from the table and FIG. 4, the concentration of each of the polyvinylene blocks—as determined by the absorption by said blocks of wavelengths ranging from 250 nm to 700 nm—remains substantially constant (i.e., to about one-part-in-five). Moreover, it will be particularly noted that the absorption-determined concentration of each of said polyvinylene blocks in the range of n=19 to 24 is not less than approximately 70% (i.e., 70%+5%) of the absorption-determined concentration of any of said polyvinylene blocks in the range of n=14 to 15. In this regard, each of the chromophores responsible for the polarizing properties in the near-red wavelength (i.e., n=19 to 24) has a relative concentration (based on the measure of its absorptance) that is no less than approximately 70% of the measured value for the chromophores responsible for polarization of wavelengths corresponding to the greatest human photopic sensitivity (i.e., 540 nm to 560 nm; n=14 to 15).

In the table above, relative concentration is calculated as follows:

$$\text{Rel. Conc.}_{(n=x)} = (\text{Absorption}_{(n=x)} / \text{Absorption}_{(n=q)}) 100$$

wherein x is a conjugation length, n, of 19 to 24, and q is a conjugation length, n, of 14 or 15. (In the above table, for purposes of illustration q is 14; calculated values would be comparable where q is 15.) As evident from the table, the chromophoric distribution of the present polarizing sheet departs substantially from that observed in the prior art "K-sheet" product. In particular, the prior art K-sheet manifests a relative concentration far below 70% for conjugation lengths 23 and 24, which may contribute to the so-called phenomena of "red-leak". Aside from diminished optical properties, polarizers manifesting "red-leak" tend to have a brownish cast, which—from the standpoint of aesthetics—is undesirable for certain display applications.

Finally, the degree of orientation of said molecules in conjunction with the concentration distribution of each polyvinylene block results in a polarizing sheet having a photopic dichroic ratio ($R_D$) of at least 45. The present inventors are unaware of accomplishment of a higher dichroic ratio by any standard commercial "K-sheet"-type polarizer (i.e., those based on an unmodified, non-grafted polyvinyl alcohol starting material).

While the present invention is to be given a scope commensurate with the appended claims, in a desirable embodiment, the orientation and the absorption-determined concentration of the light-polarizing molecules of polyvinylalcohol/polyvinylene block copolymer are such that the spectral dichroic ratio, $R_D$, at segment specific wavelengths is not less than the corresponding values presented in the following table, the values being plotted in the graph of FIG. 1:

| Conjugation Length, n | Wavelength (nm) | Dichroic Ratio, $R_D$ |
|---|---|---|
| 7 | 392 | 8.4 |
| 8 | 416 | 10.9 |
| 9 | 442 | 17.0 |
| 10 | 465 | 21.5 |
| 11 | 486 | 27.1 |
| 12 | 503 | 33.4 |
| 13 | 522 | 38.2 |
| 14 | 538 | 44.7 |
| 15 | 550 | 47.3 |
| 16 | 574 | 54.4 |
| 17 | 590 | 58.8 |
| 18 | 606 | 62.8 |
| 19 | 622 | 65.7 |
| 20 | 638 | 64.8 |
| 21 | 653 | 60.3 |

Polarizing sheets, as described above, having said novel and desirable optical properties, can be obtained through a method involving an "extension" step. In departure from prior methodologies, a previously stretched (and thereby molecularly oriented) polymeric sheet, whether allowed to relax or maintained under tension, is unidirectionally extended (i.e., "restretched") to an extent beyond that obtained in the first stretch. In addition to improving polarizing properties, this step—when coupled with other treatments hereinafter described—is highly useful in preventing the discoloration of the resultant polarizing sheet and increasing its stability to ultraviolet radiation.

While practice of the inventive methodology is subject to variation, to illustrate the invention, reference is made to a desirable, representative embodiment of the inventive methodology. In this regard, reference is made to the method for manufacturing polarizing sheet 10 schematically illustrated in FIG. 3.

Figure 3:
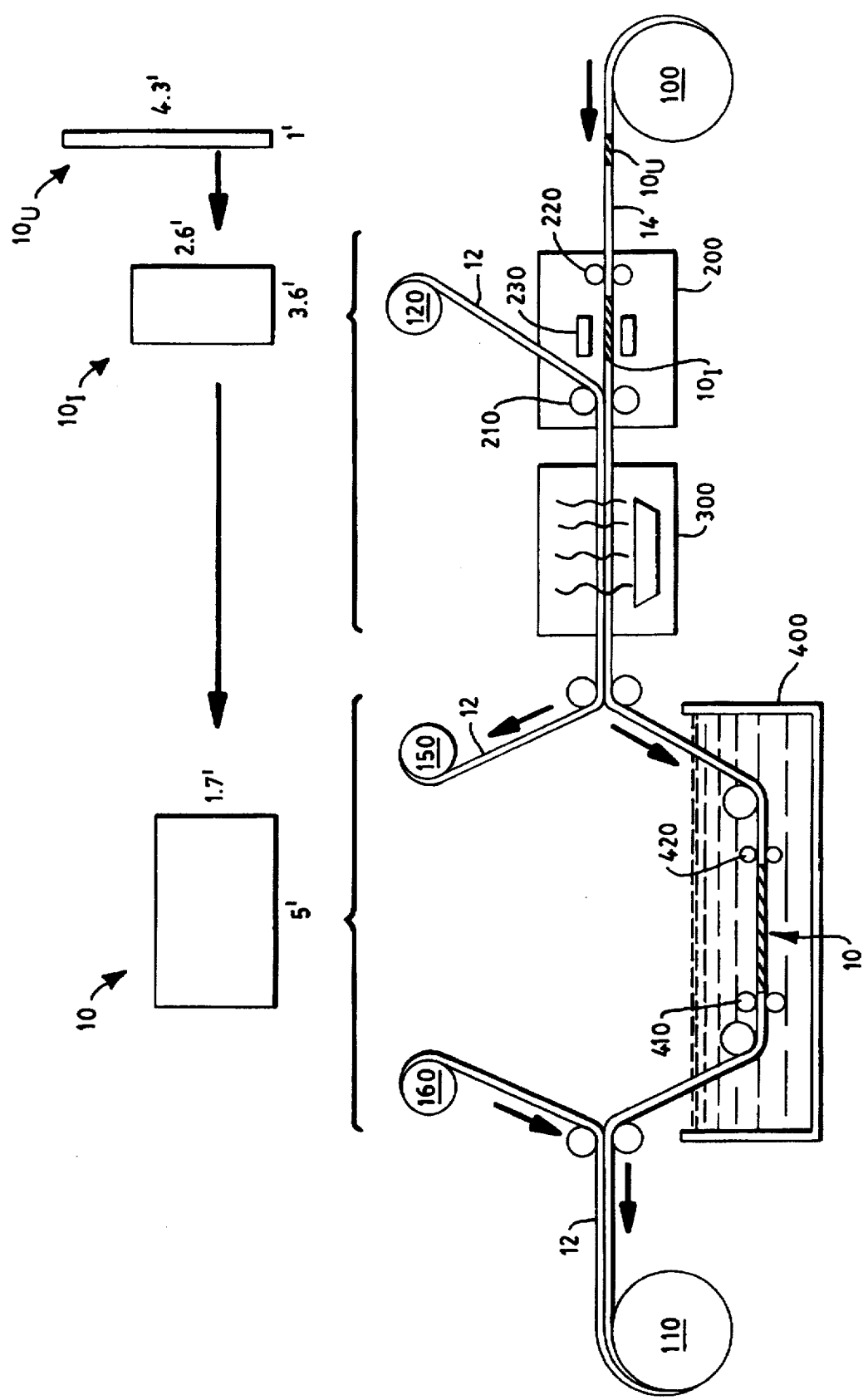
FIG. 3 is a schematic representation of one method for making a high-efficiency "K-sheet"-type polarizer, the method conducted in accordance with the present invention.

As shown in FIG. 3, the manufacture of polarizing sheet 10 commences with the provision of a polymeric sheet of an amorphous hydroxylated linear high polymer $10_U$ having a predetermined original length, and generally having a thickness in the order of 0.002 (0.051 mm) to 0.004 (0.102 mm) inches. In FIG. 3, as a representative example, the unprocessed polymeric sheet $10_U$ is shown having a length of 1' (0.304 m) and a width of 4.3' (1.307 m).

The polymeric sheet $10_U$ is transported to a suitable stretching device 200 (or other like mechanisms or systems), whereupon the amorphous unprocessed polymeric sheet $10_U$ is unidirectionally stretched from approximately 2.0 to approximately 5.0 times its predetermined original length. In the example illustrated in FIG. 3, the polymeric sheet $10_U$ is stretched 3.6 times its original length of 1' (0.304 m), resulting in an oriented sheet having a length of 3.6' (1.094 m) and a width of 2.6' (0.791 m). This stretching step effecting molecular orientation of the amorphous polymeric material—is generally conducted under the influence of moderate heat, preferably at a temperature at or above the glass transition temperature of the amorphous polymeric material. As indicated in FIG. 3, stretching can be effected by the provision of heat generating elements 230, fast rollers 210, and slow rollers 220. Difference in the rotational rate between rollers 210 and 220 are exploited to create corresponding tension in the area of web 14 transported therebetween. When said area is submitted contemporaneously to heat emitted by heat generating elements 230, stretching of web 14 is facilitated and more desirably effected. Other methods for stretching sheet $10_U$ will be apparent to those skilled in the art in light of the present disclosure. Methods for stretching polymeric sheets are described in such patents as U.S. Pat. No. 2,547,736, issued to R. Blake, U.S. Pat. No. 2,547,763, issued to Edwin H. Land and W. Ryan, and U.S. Pat. No. 2,804,652, issued to S. Balkan.

Subsequent to stretching, it will be noted that the oriented polymeric sheet assumes a somewhat fibrous nature and its tensile strength in the direction transverse to the stretch direction is diminished. In this state, the oriented polymeric sheet is susceptible to wrinkling, creasing, and other like physical artifacts resultant of handling and manipulation. Accordingly, the oriented polymeric sheet is desirably protected by the bonding or lamination of a carrier web 12 thereto. (While shown for simplicity in FIG. 3, it is not required that carrier web 12 be transported from web spool 120 in a unit or system merged or otherwise joined with stretching device 200.)

Any of a variety of materials can be used for the carrier web 12. Suitable carrier web materials include known polymeric sheet materials such as the cellulose esters (e.g., nitrocellulose, cellulose acetate, cellulose acetate butyrate), polyesters, polycarbonates, vinyl polymers such as the acrylics, and other support materials that can be provided in a sheet-like, light-transmissive form. Polyesters are especially useful, depending on the particular application and the requirements thereof. A preferred polyester is polyethylene terephthalate, available under the Mylar and Estar tradenames, although other polyethylene terephthalate materials can be employed. The thickness of the support material will vary with the particular application. In general, from the standpoint of manufacturing considerations, supports having a thickness of about 0.5 mil (0.013 mm) to about 20 mils (0.51 mm) can be conveniently employed.

Any of a variety of adhesives can be used for the lamination including polyvinyl alcohol adhesives and polyurethane adhesive materials. Inasmuch as the polarizer will normally be employed in optical applications, an adhesive material which does not have an unacceptable affect on the light transmission properties of the polarizer will generally be employed. The thickness of the adhesive material will vary with the particular application. In general, thicknesses of about 0.25 mil (0.006 mm) to about 1.0 mil (0.025 mm) are satisfactory.

Supported on a carrier web 12, the oriented sheet is transported to a dehydration device 300 (or other like mechanism or system), whereupon the oriented sheet is treated to "convert" a portion thereof to polarizing molecules consisting of block copolymers of poly(vinylene-co-vinyl alcohol). This can be achieved, for example, by exposing the oriented sheet to a suitable dehydration catalyst, preferably hydrochloric acid vapors, followed by heating the fumed sheet at temperatures in excess of 125° C.

In one particular mode of practice, the oriented polymer side (i.e., the under surface) of the web-borne sheet is maintained in device 300 a short distance from a vat of fuming acid for a period of approximately one minute and during this period is warmed by a heated cover or equivalent means (not shown) positioned closely adjacent the sheet and maintained at a temperature of approximately 130° F. With the acid fumes acting as a catalyst, the oriented sheet is then passed through a heating oven where it is subjected to a temperature of from approximately 250° F. to 350° F. for about one-half minute (or longer), whereby the oriented sheet is "converted" into the desired dehydration product, polyvinylene.

The specific conditions of heating time, temperature and acid concentration are not particularly critical. Considerable latitude in process parameters exists without detriment to the formation of the copolymer and its concomitant polarization properties. For example, the extent of penetration of the acid fumes into the oriented sheet may be controlled by altering the temperature of the acid in the vat, altering the time of exposure of the oriented sheet to the fumes, and altering the temperature of the heating element positioned adjacent the sheet. Further, suitable results can be obtained by first exposing an unstretched sheet of polyvinyl alcohol to the dehydration catalyst followed by the simultaneous heating and stretching of the sheet.

To produce the high-efficiency "K-sheet"-type polarizer of the present invention, the dehydrated, fumed, and oriented sheet $10_I$ is then submitted to the aforementioned extension step, whereupon the intermediate (so-called "Raw-K") sheet $10_I$ is unidirectionally extended (i.e., "restretched") to an extent beyond that obtained in the first stretch, generally an additional 10% to 160% and such that the final degree of stretch is at least 4.8 times (preferably much higher) the sheet's original predetermined length.

As shown, in FIG. 3, this extension step is desirably—but not necessarily—carried out in a boric bath 400. In the course of conducting such step, the sheet $10_I$ containing the oriented poly(vinylene-co-vinyl alcohol) molecules is treated with an aqueous solution of boric acid and/or borax contemporaneously with or followed by extending the sheet an additional 10% to 160% such that the final degree of stretch is at least 4.8 times (preferably much higher) the sheet's original length. As shown in the example of FIG. 3, intermediate sheet $10_I$ is stretched approximately an additional 38% its original stretched length of 3.6' (1.094 m), resulting in a highly-efficient "K-sheet-type" polarizer 10 having a length of 5' (1.520 m) and a width of 1.7' (0.517 m). In accord with the stated method parameters, polarizer 10's length of 5' (1.520 m) is greater than 4.8 times (i.e., 5 times greater) the predetermined original length of the unprocessed and amorphous polymeric sheet $10^U$.

As shown in FIG. 3, extension of converted and oriented sheet $10_I$ can be accomplished in a manner similar to the aforediscussed stretching of amorphous sheet $10_U$, i.e., by the use of fast and slow rollers 410 and 420. As with the earlier stretching step, alternative stretching methodologies can be employed.

Although extension is depicted in FIG. 3 as occurring in boric bath 400, the present invention is not limited to time and location of the extension step, nor is boration absolutely critical to its practice. For example, sheet $10_I$ can be submerged and allowed to soften and/or swell (cf., "relax") in boric bath 400, subsequently removed, and then extended. Likewise, sheet $10_I$ can be extended and then submerged into boric bath 400. In an extreme but nonetheless viable case, the sheet $10_I$ can be extended without any pre-, post-, or contemporaneous boration. As practitioners will note, however, presoaking or contemporaneous soaking in a boric ion containing solution greatly facilitates the extension of sheet $10_I$, and as such are desirably practiced when extending sheet $10_I$.

Further, although FIG. 3 depicts only a single bath, boration can employ two (or more) baths. For example, in a two-bath boration, the first bath can contain water, and the second, a boric ion contributing species. Alternatively, the order can be reversed or both baths may contain varying concentrations and/or mixtures of boric ion contributing species. Extension can be conducted in any one of these baths.

When sheet $10_f$ is borated, the boration solution will generally comprise boric acid and either sodium or potassium hydroxide, or a substance from the class consisting of the sodium and potassium borates, preferably borax. The concentration of boric acid and borax or other borate in the solution or solutions to which the oriented polarizing sheet is subjected are not critical. Preferably, the boric acid is present in higher concentration than the borax or other borate, and a preferred concentration comprises 9% by weight of boric acid and 3% by weight of borax. Other satisfactory concentrations, however, may include solutions of a boric acid concentration of 16% by weight or even higher and a borax concentration of about 6% by weight, or solutions having concentrations of 9% by weight of boric acid and 1% by weight of borax or other variations within the ranges indicated. Preferably, the solutions should contain from 1% to 6% by weight of borax and from about 5% to about 20% by weight of boric acid. The polarizing sheets or films are imbibed in these solutions for a period of about four minutes or slightly longer with the temperature of the solutions preferably maintained at about 60° C.

Boration of the molecularly oriented polymeric sheet is subject to considerable variation. For example, the temperature of the boric acid solution may be varied from approximately room temperature to boiling, and the concentration thereof may be increased at the higher temperatures. It is desirable that the solution be heated at least to near 60° C. in order to accomplish rapid "swelling" of the sheet before the cross-linking takes place. Thus at room temperature, the cross-linked material tends to form a barrier layer adjacent the surface of the sheet which effectively resists further penetration by the solution, although it should be noted that the resulting sheet has substantially improved stability.

Other alternative boration methodologies and the effects obtained thereby are explained in the patent literature. For further details concerning boration, reference can be made to U.S. Pat. Nos. 2,445,555, 2,453,186, 2,554,850, and 2,674,159.

Subsequent to the extension step, the resulting high-efficiency K-polarizer 10 can again be bonded or laminated to a carrier web 12, the carrier web (shown in FIG. 3 on spool 160) being the same or different from the web stripped off fumed, oriented sheet $10_f$ prior to extension thereof. Supported on web 12, polarizer sheet 10 is "taken-up" on roller 110 with comparatively greater ease and a reduced frequency of handling defects (e.g., wrinkles, creases, and the like).

Figure 2:
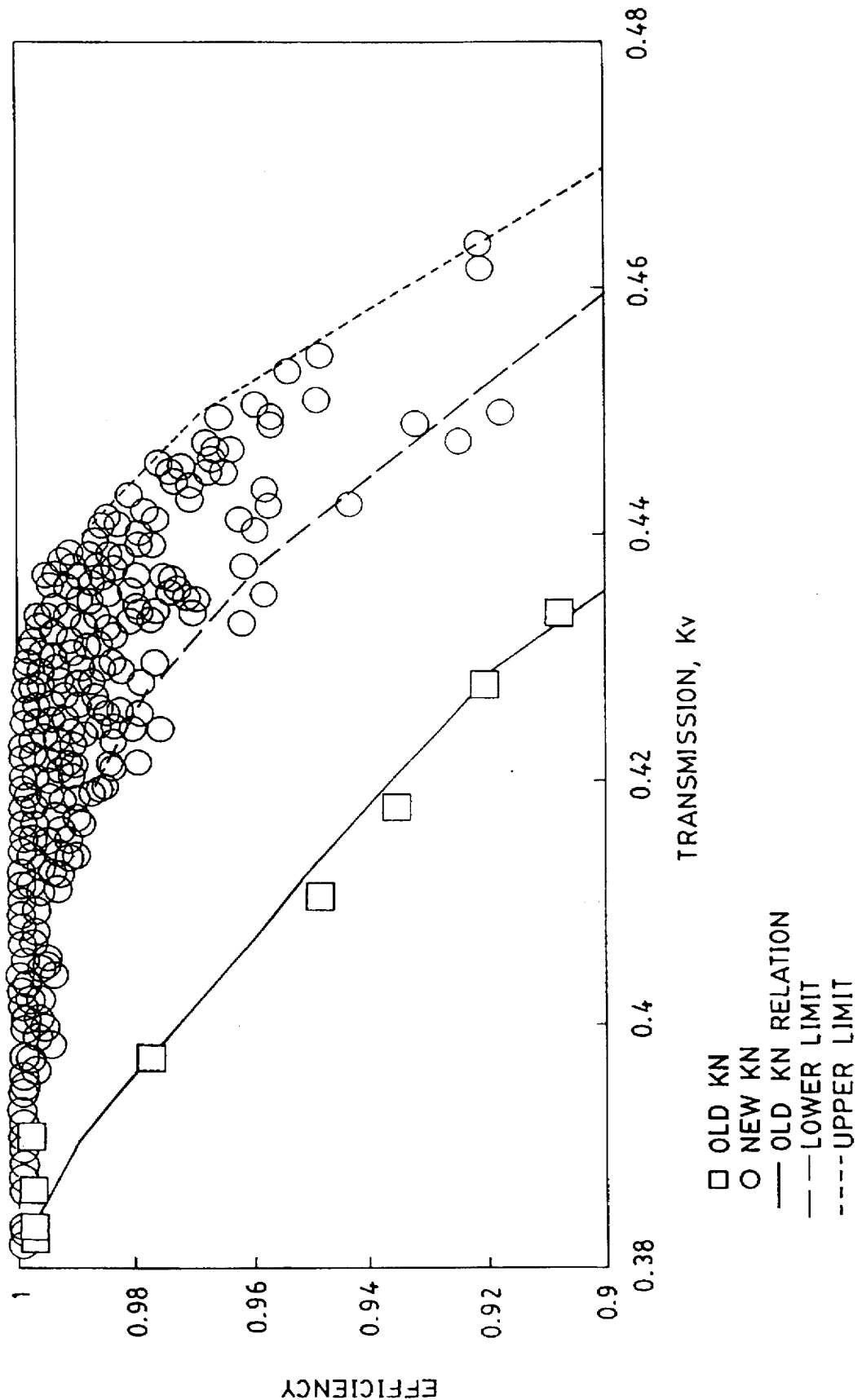
FIG. 2 is a graph plotting polarizing efficiency against transmission, $K_v$, for a prior art polarizing sheet and polarizing sheets according to the present invention.

It will, of course, be apparent that light polarizing sheets embodying the product of the present invention may be laminated between or to supporting sheets or films, such as sheets of glass or sheets of other organic plastic materials, and that light polarizers of the present invention either in laminated or unlaminated form may be employed wherever other forms of light-polarizing plastic materials have heretofore been used, for example, in connection with liquid crystal display panels, sunglasses, sun visors, window pane glass, CRT-monitor glare elimination systems, advertising displays, glare masks, and room partitions. Regardless of its final product application, the polarization properties of the poly(vinylene-co-vinyl alcohol) complex, especially those complexed with boric acid/borax, are significantly improved over the corresponding properties of sheet polarizers prepared according to U.S. Pat. Nos. 2,255,940 (Rogers) and 2,445,555 (Binda). See e.g., FIG. 2.

While the present invention is described herein with reference primarily to polarizing sheets derived from molecularly oriented polyvinyl alcohol, it is to be understood that the use of molecularly oriented polymers other than polyvinyl alcohol is contemplated. In this regard, the polymeric starting material may be selected from any hydroxylated linear high polymer or derivative thereof, or any compound which can be converted into a hydroxylated linear high polymer. Specifically, aside from polyvinyl alcohol, the inventors contemplate the use of polyvinyl acetals, polyvinyl ketals, and polyhydroxy alkanes as materials from which the molecularly oriented sheet or film can be formed. The light polarizer of the present invention, therefore, may be said to comprise a dehydration product of a molecularly oriented polyvinyl oxy compound of the class described.

The term "acetals and ketals of polyvinyl alcohol" is to be understood as generic to the class of resins formed from polyvinylacetate by the successive or combined steps of hydrolysis and condensation with aldehydes and ketones, respectively. It should be pointed out however, that when the invention is practiced with mixed polymers or derivatives of polyvinyl alcohol, incomplete derivatives should be used; some of the hydroxyl groups of the polyvinyl alcohol should remain unreacted in order to enter into the subsequent esterification reaction.

The product of the present invention is especially useful as a light-polarizing filter in display devices where the filter is positioned closely adjacent a relatively intense source of illumination which remains lighted continuously for long periods. Under these circumstances the polarizing filter may be subjected to temperatures in the neighborhood of 125° F. or even higher for protracted periods. It shows no unacceptable loss in its high-efficiency polarizing properties, no discoloration, and no darkening after such protracted exposure to heat.

To further illustrate the present invention, the following Examples are provided, but the present invention is not to be construed as being limited thereto. Unless otherwise indicated, all parts, percents and ratios are by weight. In the Examples, dichroic ratio, transmittance, and polarizing efficiency are determined by the following methods.

The dichroic ratio, $R_D$, used as a measure of the polarizing optical properties of the film is defined as:

$$R_D = A_{par}/A_{perp}$$

where $A_{par}$ and $A_{perp}$ are determined by absorption spectroscopy.

Absorption is measured using a UV/VIS spectrophotometer having a polarizer placed, for example, in both the sample and the reference beam. For measurement of photopic dichroic ratio, the sample and reference beams are both beams of white light. For measurement of spectral dichroic ratio, the beams were of a wavelength correspondent with the conjugation length of the chromophore under investigation. In both cases, an absorption spectrum between 400 and 700 nm is considered with the optical axis of a film sample being parallel to the optical axis of the polarizer in the sample beam and then after rotating the sample polarizer over 90°. Thus, the absorption at the wavelength of maximum absorption in both situations, denoted by $A_{par}$ and $A_{perp}$ respectively are determined, from which $R_D$ can be calculated.

The transmittance of visible light (wavelength: 400 to 700 nm) is also determined with a spectrophotometer. A polarizer is placed on the incident light side. The transmission axis of a polarizing film sample is overlapped with the optical axis of the polarizer and then placed at right angles thereto. Then, the transmittance of the polarizing film in each case was determined.

The algebraic mean of the data was referred to as the transmittance. The polarizing efficiency was calculated according to the following equation by determining the transmittance with axes parallel ($T_{par}$) which was determined by overlapping two polarizing films in such a manner as to make the axes thereof parallel with each other, and the transmittance with axes crossed ($T_{perp}$), which was determined by overlapping the same in such a manner as to make the axes at right angles to each other:

$$\text{Polarizing efficiency}(\%) = (T_{par} - T_{prep})/(T_{par} + T_{prep}) \times 100$$

The ideal sets of maximum values of transmittance and polarizing efficiency of a polarizing film are 50% and 100%, respectively.

Although a polarizing film is usually used in a state having a protected film laminated thereon, various properties of unprotected polarizing films were determined in the following Examples and Comparative Examples.

Examples

Examples 1 to 4

Sheets (approximately 2 mils thick) of a high molecular weight polyvinyl alcohol (98.0% or greater hydrolysis) were unidirectionally stretched 3.6 times their original length, under the influence of moderate heat (~125° C). To effect production of conjugated blocks of polyvinylene therein, the stretched sheets were then exposed to a dehydration catalyst, i.e., fuming hydrochloric acid vapors, then heated to a temperature in excess of 125° C. Subsequently, the sheets were immersed in an aqueous solution of boric acid and borax. Finally, to obtain the desired high-efficiency K-sheet polarizer, the sheets were then unidirectionally extended an additional 10% to an additional 60% (based on its length resultant of the boration treatment), such that the final degree of stretch for each sheet was at least 4.8 times higher relative to the original length.

Prior to both boration and the unidirectional extension step, samples of the intermediate product ("Raw K") were quantitatively analyzed and shown to have a transmittance ($K_V$) of 21.5%, a polarization efficiency of 97.6%, and a photopic dichroic ratio ($R_D$) of 7.0. For comparison, similar analyses of samples of the high-efficiency K-Sheets and a Control (A) were conducted, the results thereof being reproduced in the following Table 1.

TABLE 1

Polyvinyl Alcohol Sheets
initially Stretched 3.6 × Original Length

|  | Control A | Ex. 1 | Ex. 2 | Ex. 3 | Ex. 4 |
|---|---|---|---|---|---|
| Temp. (°C.) | 77 | 80 | 77 | 90 | 85 |
| Boric (%) | 9 | 9 | 9 | 21 | 15 |
| Borax (%) | 3 | 3 | 3 | 7 | 3 |
| Extension (%) | 0 | 37.5 | 43.8 | 50.0 | 43.8 |
| Transmittance, $K_v$ (%) | 38.34 | 40.51 | 41.09 | 41.70 | 41.23 |
| Polarizing Efficiency (%) | 99.82 | 99.46 | 99.34 | 99.04 | 99.39 |
| Photopic Dichroic Ratio, $R_D$ | 39 | 47 | 50 | 53 | 53 |

As evident from Table 1, transmittance, $K_V$, and photopic dichroic ratio, $R_D$, are notably improved in all samples submitted to extension, i.e., Examples 1 to 4.

Examples 5 and 6

Sheets of polyvinyl alcohol, unidirectionally stretched 4.0 times their original length, were dehydrated in the manner of Examples 1 to 4. An intermediate "Raw-K" sample exhibited a transmittance, $K_V$, of 16.7, a polarizing efficiency of 98.80, and a photopic dichroic ratio, $R_D$, of 8. Samples were subsequently borated and unidirectionally extended, again, in the manner of Examples 1 to 4. The results of analyses are set forth in the following Table 2.

TABLE 2

Polyvinyl Alcohol Sheets
Initially Stretched 4.0 × Original Length

|  | Control B | Example 5 | Example 6 |
|---|---|---|---|
| Temp (°C.) | 70 | 70 | 70 |
| Boric (%) | 9 | 9 | 9 |
| Borax (%) | 3 | 3 | 3 |
| Extension (%) | 0 | 25.0 | 50.0 |
| Transmittance, $K_v$ (%) | 35.81 | 38.62 | 42.59 |
| Polarizing Efficiency (%) | 99.97 | 99.91 | 98.14 |
| Photopic Dichroic Ratio, $R_D$ | 36 | 45 | 55 |

As evident from Table 2, transmittance, $K_V$, and photopic dichroic ratio, $R_D$, are notably improved in all samples submitted to extension, i.e., Examples 5 and 6.

Examples 7 and 8

Sheets of polyvinyl alcohol, unidirectionally stretched 4.5 times its original length, were dehydrated in the manner of Examples 1 to 4. This intermediate "Raw-K" sample exhibited a transmission, $K_V$, of 19.63, a polarizing efficiency of 99.69, and a photopic dichroic ratio, $R_D$, of 8.5. Samples were subsequently borated and unidirectionally extended, again, in the manner of Examples 1 to 4. The results of analyses are set forth in the following Table 3.

TABLE 3

Polyvinyl Alcohol sheets
Initially Stretched 4.5 × Original Length

|  | Control C | Example 4 | Example 8 |
|---|---|---|---|
| Temp (°C.) | 70 | 70 | 70 |
| Boric (%) | 9 | 9 | 9 |
| Borax (%) | 3 | 3 | 3 |
| Extension (%) | 0 | 30.0 | 35.0 |
| Transmittance, $K_v$ (%) | 36.81 | 40.83 | 41.48 |
| Polarizing Efficiency (%) | 99.95 | 99.85 | 99.88 |
| Photosic Dichroic Ratio, $R_D$ | 38 | 61 | 72 |

As evident from Table 3, transmittance, $K_V$, and photopic dichroic ratio, $R_D$, are notably improved in all samples submitted to extension, i.e., Examples 7 and 8.

In summary, as evident from Examples 1 to 8, demonstrably improved polarizing properties can be obtained by implementing an extension step in a K-sheet manufacturing process. However, since certain changes and modifications in the article and method which embody the invention can be made, it is intended that all matter contained in the Examples be considered illustrative and not definitive.

We claim:

1. A light polarizer comprising a molecularly oriented sheet of polyvinylalcohol/polyvinylene block copolymer material having the polyvinylene blocks thereof formed by molecular dehydration of a sheet of polyvinylalcohol;

said molecularly oriented sheet of polyvinylalcohol/polyvinylene block copolymer material comprising a substantially uniform distribution of light-polarizing molecules of polyvinylalcohol/polyvinylene block copolymer material varying in the length, n, of the conjugated repeating vinylene unit of the polyvinylene block of the copolymer throughout the range of from 2 to 24;

the degree of orientation of said light-polarizing molecules, as measured by the spectral dichroic ratio, $R_D$, of said blocks, increasing throughout said range with increasing length, n, of said polyvinylene blocks;

the concentration of each of said polyvinylene blocks, as determined by the absorption of wavelengths from 200 to 700 nm by said blocks, being such that said absorption-determined concentration of each of said polyvinylene blocks in the range of n=19 to 24 is not less than approximately 70% of the absorption-determined concentration of any of said polyvinylene blocks in the range of n=14 or 15;

said light polarizer sheet exhibiting a photopic dichroic ratio, $R_D$, of at least approximately 45.

2. The polarizer of claim 1, wherein a portion of the sheet further comprises a moisture-resistance imparting complex of said polyvinyl alcohol/polyvinylene block copolymer and boric acid.

3. The polarizer of claim 1, wherein a portion of the sheet further comprises a moisture-resistance imparting complex of said polyvinyl alcohol/polyvinylene block copolymer and a borax.

4. The polarizer of claim 1, wherein the orientation and the absorption-determined concentration of said molecules are such that the spectral dichroic ratio, $R_D$, at segment specific wavelengths is not less than the corresponding values presented in the following table:

| Conjugation Length, n | Wavelength (nm) | Dichloric Ratio, $R_D$ |
| --- | --- | --- |
| 7 | 392 | 8.4 |
| 8 | 416 | 10.9 |
| 9 | 442 | 17.0 |
| 10 | 465 | 21.5 |
| 11 | 486 | 27.1 |
| 12 | 503 | 33.4 |
| 13 | 522 | 38.2 |
| 14 | 538 | 44.7 |
| 15 | 550 | 47.3 |

-continued

| Conjugation Length, n | Wavelength (nm) | Dichloric Ratio, $R_D$ |
| --- | --- | --- |
| 16 | 574 | 54.4 |
| 17 | 590 | 58.8 |
| 18 | 606 | 62.8 |
| 19 | 622 | 65.7 |
| 20 | 638 | 64.8 |
| 21 | 653 | 60.3 |

5. The polarizer of claim 1, wherein said sheet of polyvinylalcohol/polyvinylene block copolymer material is a stretched and extended sheet.

6. The polarizer of claim 1, wherein said sheet of polyvinylalcohol/polyvinylene block copolymer material is a stretched, borated, and extended sheet.

7. A method for making a polarizer from a polymeric sheet having a predetermined original length and comprising a hydroxylated linear high polymer, the method comprising the steps of:

(a) unidirectionally stretching the polymeric sheet from approximately 2.0 to approximately 5.0 times it original length;

(b) exposing the stretched sheet to fuming acidic vapors;

(c) heating the fumed oriented sheet at a temperature appropriate to effect dehydration of the fumed sheet and to thereby form light absorbing, vinylene block segments; and (d) unidirectionally extending the dehydrated, fumed, and oriented sheet an additional 10 to 160% such that the overall degree of stretch is at least 4.8 times that of the predetermined original length.

8. The method of claim 7, wherein the hydroxylated linear high polymer is polyvinyl alcohol.

9. The method of claim 8, wherein the dehydrated, fumed, and oriented sheet is unidirectionally extended in a boric ion containing solution.

10. The method of claim 9, wherein the polymeric sheet submitted to said acid fuming and said heating is supported on a carrier web, support by the carrier web being discontinued prior to said unidirectional extension and continued after said unidirectional extension.

\* \* \* \* \*